(12) United States Patent
Hashizume et al.

(10) Patent No.: US 8,999,562 B2
(45) Date of Patent: Apr. 7, 2015

(54) SECONDARY BATTERY AND SECONDARY BATTERY ELECTROLYTIC SOLUTION FOR USE IN SECONDARY BATTERY

(75) Inventors: Yoko Hashizume, Tokyo (JP); Daisuke Kawasaki, Tokyo (JP); Masahiro Suguro, Tokyo (JP); Midori Shimura, Tokyo (JP); Kazuaki Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/812,044

(22) PCT Filed: Aug. 26, 2011

(86) PCT No.: PCT/JP2011/069272
§ 371 (c)(1),
(2), (4) Date: Jan. 24, 2013

(87) PCT Pub. No.: WO2012/029645
PCT Pub. Date: Mar. 8, 2012

(65) Prior Publication Data
US 2013/0230762 A1    Sep. 5, 2013

(30) Foreign Application Priority Data
Sep. 2, 2010 (JP) ................................. 2010-196623

(51) Int. Cl.
*H01M 2/00* (2006.01)
*H01M 10/0566* (2010.01)
(Continued)

(52) U.S. Cl.
CPC .......... *H01M 10/0566* (2013.01); *H01M 4/621* (2013.01); *H01M 10/052* (2013.01); *H01M 10/0567* (2013.01); *H01M 10/0569* (2013.01); *H01M 10/0585* (2013.01); *H01M 4/133* (2013.01); *H01M 4/134* (2013.01); *H01M10/0525* (2013.01); *H01M 2004/027* (2013.01); *Y02T 10/7011* (2013.01); *Y02E 60/122* (2013.01)

(58) Field of Classification Search
None
See application file for complete search history.

(56) References Cited

U.S. PATENT DOCUMENTS

| 2006/0235144 A1 | 10/2006 | Hwang et al. |
| 2008/0102375 A1* | 5/2008 | Shima ............................ 429/331 |
| 2009/0169985 A1 | 7/2009 | Yamaguchi et al. |

FOREIGN PATENT DOCUMENTS

| JP | 06-325765 A | 11/1994 |
| JP | 2003-123740 A | 4/2003 |

(Continued)

OTHER PUBLICATIONS

International Search Report of PCT/JP2011/069272 dated Oct. 11, 2011.

*Primary Examiner* — Patrick Ryan
*Assistant Examiner* — Jose Colucci Rios
(74) *Attorney, Agent, or Firm* — Sughrue Mion, PLLC

(57) ABSTRACT

A secondary battery capable of suppressing deterioration of rate characteristics and cycle characteristics even under a high-temperature environment is provided. The secondary battery according to an exemplary embodiment is a secondary battery having an electrode element in which a positive electrode and a negative electrode are arranged so as to face each other, an electrolytic solution and an outer package packaging the electrode element and the electrolytic solution, in which the negative electrode is formed by binding a negative electrode active material to a negative electrode collector, with a negative electrode binder; and the electrolytic solution contains an organic sulfurane compound. The secondary battery electrolytic solution according to the exemplary embodiment contains an organic sulfurane compound.

13 Claims, 4 Drawing Sheets

(51) Int. Cl.
*H01M 4/62* (2006.01)
*H01M 10/052* (2010.01)
*H01M 10/0567* (2010.01)
*H01M 10/0569* (2010.01)
*H01M 10/0585* (2010.01)
H01M 4/133 (2010.01)
H01M 4/134 (2010.01)
H01M 10/0525 (2010.01)
H01M 4/02 (2006.01)

(56) References Cited

FOREIGN PATENT DOCUMENTS

| | | |
|---|---|---|
| JP | 2004-022433 A | 1/2004 |
| JP | 2004-047404 A | 2/2004 |
| JP | 2006-294615 A | 10/2006 |
| JP | 2007-095670 A | 4/2007 |
| JP | 2008-147117 A | 6/2008 |
| JP | 2009-176719 A | 8/2009 |

* cited by examiner

SECONDARY BATTERY AND SECONDARY BATTERY ELECTROLYTIC SOLUTION FOR USE IN SECONDARY BATTERY

CROSS REFERENCE TO RELATED APPLICATIONS

This application is a National Stage of International Application No. PCT/JP2011/069272 filed Aug. 26, 2011, claiming priority based on Japanese Patent Application No. 2010-196623 filed Sep. 2, 2010, the contents of all of which are incorporated herein by reference in their entirety.

TECHNICAL FIELD

An exemplary embodiment according to the present invention relates to a secondary battery and a secondary battery electrolytic solution for use in the secondary battery, and particularly to a lithium ion secondary battery and a secondary battery electrolytic solution for use in the lithium ion secondary battery.

BACKGROUND ART

With rapid expansion of such as notebook computer, mobile phone and electric car markets, high energy-density secondary batteries have been desired. Approaches to providing a high energy density secondary battery include a method of using a large-capacity negative electrode material and a method of using a nonaqueous electrolytic solution excellent in stability.

Patent Literature 1 discloses use of an oxide of silicon or silicate as a negative electrode active material of a secondary battery. Patent Literature 2 discloses a secondary-battery negative electrode having a carbon material particle capable of absorbing and releasing lithium ions, a metal particle capable of alloying with lithium, and an active material layer containing an oxide particle capable of absorbing and releasing lithium ions. Patent Literature 3 discloses a secondary-battery negative electrode material formed by coating the surface of particles having a structure in which silicon fine crystals are dispersed in a silicon compound, with carbon.

Patent Literature 4 and Patent Literature 5 describe that if silicon is contained in a negative electrode active material, polyimide is used as a negative electrode binder. Patent Literature 6 describes that sulfurane is used as a solvent of an electrolytic solution.

CITATION LIST

Patent Literature

Patent Literature 1: JP6-325765A
Patent Literature 2: JP2003-123740A
Patent Literature 3: JP2004-47404A
Patent Literature 4: JP2004-22433A
Patent Literature 5: JP2007-95670A
Patent Literature 6: JP2006-294615A

SUMMARY OF INVENTION

Technical Problem

However, the secondary battery, which is described in Patent Literature 1, using silicon oxide as a negative electrode active material has a problem in that if the secondary battery is charged or discharged at 45° C. or more, capacity reduction due to a charge-discharge cycle significantly increases. The secondary-battery negative electrode described in Patent Literature 2 is effective for reducing volume change of the entire negative electrode in absorbing and releasing lithium, since three types of components have different charge-discharge potentials. However, in Patent Literature 2, as to the relationship of three types of components in the coexistence state and matters indispensable for forming a lithium ion secondary battery, such as a binder, an electrolytic solution, an electrode element structure and an outer package, many points that are not sufficiently studied are seen. The secondary battery negative electrode material described in Patent Literature 3 is also effective for reducing volume change of the entire negative electrode. However, in Patent Literature 3, as to matters indispensable for forming a lithium ion secondary battery, such as a binder, an electrolytic solution, an electrode element structure and an outer package, many points that are not sufficiently studied are seen.

In Patent Literature 4 and Patent Literature 5, studies on the state of a negative electrode active material are insufficient. In addition, many points including an electrolytic solution, an electrode element structure and an outer package, which are indispensable for forming a lithium ion secondary battery, were not sufficiently studied. In Patent Literature 6, the type of sulfurane compound to be used as a solvent of an electrolytic solution is not sufficiently studied. In addition, as to matters indispensable for forming a lithium ion secondary battery, such as a negative electrode active material, a binder, an electrolytic solution, an electrode element structure and an outer package, many points that are not sufficiently studied are seen.

Furthermore, in the field of lithium ion secondary battery, deterioration of rate characteristics and cycle characteristics is a problem in the case where the battery is charged and discharged particularly under a high-temperature environment and development of a technique capable of overcoming the problem has been desired.

Then, the exemplary embodiment according to the present invention is directed to providing a secondary battery having rate characteristics and cycle characteristics that rarely deteriorate even under a high-temperature environment, and a secondary battery electrolytic solution for use in the secondary battery.

Solution to Problem

An exemplary embodiment according to the present invention is directed to a secondary battery having an electrode element in which a positive electrode and a negative electrode are arranged so as to face each other, an electrolytic solution and an outer package packaging the electrode element and the electrolytic solution, in which the negative electrode is formed by binding a negative electrode active material to a negative electrode collector with a negative electrode binder; and the electrolytic solution contains an organic sulfurane compound.

An exemplary embodiment according to the present invention is directed to a secondary battery electrolytic solution containing an organic sulfurane compound.

Advantageous Effect of Invention

According to the exemplary embodiment of the present invention, it is possible to provide a secondary battery that rarely causes deterioration of rate characteristics and cycle characteristics even under a high temperature environment.

DESCRIPTION OF EMBODIMENT

The exemplary embodiment will be more specifically described below.

A secondary battery according to an exemplary embodiment has an electrode element having a positive electrode and a negative electrode arranged to face each other and an electrolytic solution, packaged in an outer package. The form of the secondary battery may be a cylindrical type, a planar winding rectangular type, a laminate rectangular type, a coin type, a planar winding laminate type or a laminate type; the form of the secondary battery is preferably a laminate type. Now, a laminate type secondary battery will be described below.

Figure 1:
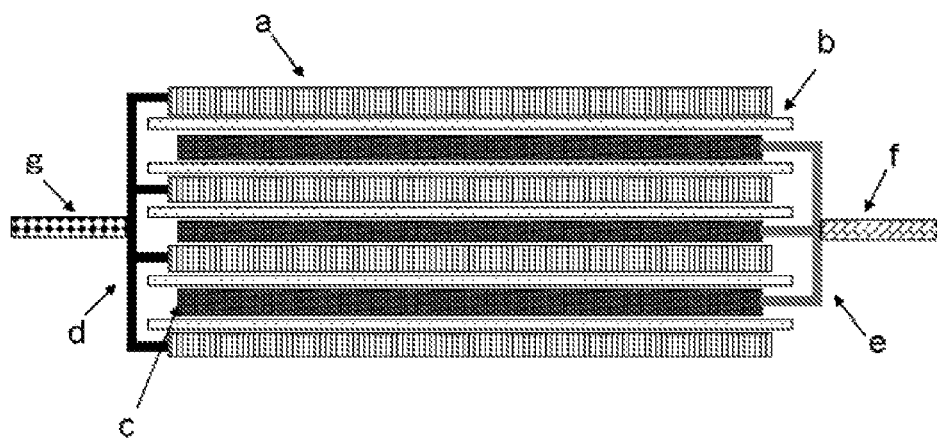
FIG. 1 This is a schematic sectional view showing a structure of an electrode element which a laminate type secondary battery has.

FIG. 1 is a schematic sectional view showing a structure of an electrode element which a laminate type secondary battery has. The electrode element is formed by alternately laminating a plurality of positive electrodes c and a plurality of negative electrodes a with each separator b interposed between them. Positive electrode collectors e which individual positive electrodes c have are mutually welded at the end portions not coated with the positive electrode active material and electrically connected. Furthermore, to the welded portion, a positive electrode terminal f is welded. Negative electrode collectors d which individual negative electrodes a have are mutually welded at the end portions not covered with a negative electrode active material and electrically connected. Further, to the welding portion, a negative electrode terminal g is welded.

Because an electrode element having such a planar laminate structure has no small R portion (region near a winding core of a winding structure), it has the advantage of being rarely affected by volume change of an electrode due to charge-discharge, compared to an electrode element having a winding structure. In other words, the electrode element is effective in the case of using an active material likely causing volume expansion. In contrast, in the electrode element having a winding structure, since an electrode is curved, the structure tends to deform when volume change occurs. Particularly, in the case of using a negative electrode active material such as a silicon oxide causing a large volume change due to charge-discharge, in a secondary battery using an electrode element having a winding structure, capacity reduction due to charge-discharge is significant.

However, an electrode element having a planar laminate structure has a problem. If gas is generated between electrodes, the generated gas is likely to remain between the electrodes. This is because in the case of an electrode element having a winding structure, the interval between the electrodes is rarely widened because tension is applied to the electrodes, whereas in the case of an electrode element having a laminate structure, the interval between the electrodes tends to be widened. If the outer package is formed of an aluminum laminate film, this problem becomes particularly significant.

In the exemplary embodiment, the aforementioned problems can be solved and a laminate type lithium ion secondary battery using a high-energy negative electrode can be also used for a long time.

[1] Negative Electrode

The negative electrode has a negative electrode active material bound to a negative electrode collector with a negative electrode binder so that the negative electrode collector is covered therewith.

As the negative electrode active material, a carbon material (a) capable of absorbing and releasing lithium ions, a metal (b) capable of forming an alloy with lithium and a metal oxide (c) capable of absorbing and releasing lithium ions are included. The negative electrode active materials can be used alone or in combination of two or more types. Of them, the negative electrode active material preferably contains a metal (b) and a metal oxide (c). Furthermore, the negative electrode active material preferably contains also a carbon material (a) and more preferably contains a carbon material (a), a metal (b) and a metal oxide (c).

As the carbon material (a), graphite, amorphous carbon, diamond-like carbon, carbon nanotube or a composite of these can be used. Graphite herein, which has a high crystallinity, has a high electric conductivity, excellent adhesiveness to a positive electrode collector formed of a metal such as copper, and excellent voltage flatness. In contrast, amorphous carbon, which has low crystallinity, since it is relatively low in volume expansion, it is highly effective to reduce volume expansion of the entire negative electrode, and in addition, deterioration due to non-uniformity such as crystal grain boundary and defect rarely occurs. The content of the carbon material (a) in the negative electrode active material may be 0% by mass or 100% by mass, preferably 2% by mass or more and 50% by mass or less, and more preferably 2% by mass or more and 30% by mass or less.

As the metal (b), Al, Si, Pb, Sn, In, Bi, Ag, Ba, Ca, Hg, Pd, Pt, Te, Zn, La or an alloy of two types or more of these can be used. Particularly, as the metal (b), silicon (Si) is preferably included. The content of the metal (b) in the negative electrode active material may be 0% by mass or 100% by mass, preferably 5% by mass or more and 95% by mass or less, more preferably 10% by mass or more and 90% by mass or less, and further preferably 20% by mass or more and 50% by mass or less.

As the metal oxide (c), silicon oxide, aluminum oxide, tin oxide, indium oxide, zinc oxide, lithium oxide or a composite of these can be used. Particularly, as the metal oxide (c), silicon oxide is preferably included. This is because silicon oxide is relatively stable and rarely causes a reaction with another compound. Moreover, to the metal oxide (c), a single or two types or more elements selected from nitrogen, boron and sulfur can be added, for example, in an amount of 0.1 to 5% by mass. In this manner, the electric conductivity of the metal oxide (c) can be improved. The content of the metal oxide (c) in the negative electrode active material may be 0% by mass or 100% by mass, preferably 5% by mass or more and 90% by mass or less, more preferably 40% by mass or more and 80% by mass or less, and further preferably 50% by mass or more and 70% by mass or less.

It is preferable that the metal oxide (c) wholly or partly has an amorphous structure. The metal oxide (c) having an amorphous structure can suppress volume expansion of other negative electrode active material, i.e., a carbon material (a) and a metal (b) and also suppress decomposition of an electrolytic solution containing a phosphoric acid ester compound. Although the mechanism of this is unclear, the amorphous structure of the metal oxide (c) may probably have some effect on formation of a film on the interface between the carbon material (a) and an electrolytic solution. Furthermore, the amorphous structure is thought to be relatively free from factors due to non-uniformity such as crystal grain boundary and defects. Note that whether whole or part of the metal oxide (c) has an amorphous structure can be checked by X-ray diffraction analysis (general XRD analysis). Specifically, if the metal oxide (c) does not have an amorphous structure, a peak intrinsic to the metal oxide (c) is observed, whereas if the whole or part of the metal oxide (c) has an amorphous structure, it is observed that the peak intrinsic to the metal oxide (c) becomes wide.

Furthermore, in the case where a negative electrode active material contains a metal (b) and a metal oxide (c), it is preferable that the metal (b) is wholly or partly dispersed in the metal oxide (c). If at least a portion of the metal (b) is dispersed in the metal oxide (c), the volume expansion of the entire negative electrode can be further suppressed and also suppress decomposition of an electrolytic solution. Note that whether the whole or part of the metal (b) is dispersed in the metal oxide (c) can be checked by using transmission electron microscopic observation (general TEM observation) and energy dispersive X-ray spectrometry analysis (general EDX analysis) in combination. More specifically, this can be checked by observing a section of a sample containing the metal particle (b) and measuring the oxygen concentration of the metal particle (b) dispersed in the metal oxide (c) to confirm that the metal constituting the metal particle (b) is not converted into an oxide.

Furthermore, in the case where a negative electrode active material contains a metal (b) and a metal oxide (c), the metal oxide (c) is preferably an oxide of the metal constituting the metal (b).

A negative electrode active material in which a carbon material (a), a metal (b) and a metal oxide (c) are contained, and whole or part of the metal oxide (c) has an amorphous structure, whole or part of the metal (b) is dispersed in the metal oxide (c), can be prepared by a method disclosed, for example, in Patent Literature 3. More specifically, a metal oxide (c) is subjected to a CVD process under an atmosphere containing an organic gas such as methane gas, with the result that a composite in which the metal (b) of the metal oxide (c) is nano-clustered and whose surface is coated with a carbon material (a) is obtained. Furthermore, the negative electrode active material can be also prepared by blending a carbon material (a), a metal (b) and a metal oxide (c) by a mechanical milling.

In the case where the negative electrode active material contains a metal (b) and a metal oxide (c), the ratio of metal (b) and metal oxide (c) is not particularly limited. The content of metal (b) relative to the total of the metal (b) and the metal oxide (c) is preferably 5% by mass or more and 90% by mass or less and preferably 20% by mass or more and 50% by mass or less. The content of metal oxide (c) relative to the total of the metal (b) and the metal oxide (c) is preferably 10% by mass or more and 95% by mass or less and preferably 50% by mass or more and 80% by mass or less.

In the case where a negative electrode active material contains a carbon material (a), a metal (b) and a metal oxide (c), the ratio of a carbon material (a), a metal (b) and a metal oxide (c) is not particularly limited. The ratio of the carbon material (a) relative to the total of the carbon material (a), the metal (b) and the metal oxide (c) is preferably 2% by mass or more and 50% by mass or less and preferably 2% by mass or more and 30% by mass or less. The ratio of the metal (b) relative to the total of the carbon material (a), the metal (b) and the metal oxide (c) is preferably 5% by mass or more and 90% by mass or less and preferably 20% by mass or more and 50% by mass or less. The ratio of the metal oxide (c) relative to the total of the carbon material (a), the metal (b) and the metal oxide (c) is preferably 5% by mass or more and 90% by mass or less and preferably 40% by mass or more and 70% by mass or less.

Furthermore, the carbon material (a), the metal (b) and the metal oxide (c) are not particularly limited however, particulate forms can be used respectively. For example, the average particle size of the metal (b) can be set to be smaller than the average particle size of the carbon material (a) and the average particle size of the metal oxide (c). If so, the metal (b), which is small in volume change during a charge-discharge, is present in a relatively small particle size; whereas carbon material (a) and metal oxide (c), which are large in volume change, are present in relatively large particle sizes. Thus, production of dendrite and pulverization of an alloy can be effectively suppressed. Furthermore, during a charge-discharge process, lithium is absorbed or released sequentially in the order of a large-size particle, a small-size particle and a large-size particle. Also in this respect, occurrence of residual stress and residual strain is suppressed. The average particle size of the metal (b) can be set, for example, at 20 μm or less and preferably 15 μm or less.

It is preferable that the average particle size of a metal oxide (c) is ½ or less of the average particle size of a carbon material (a), and that the average particle size of a metal (b) is ½ or less of the average particle size of the metal oxide (c). Furthermore, it is more preferable that the average particle size of metal oxide (c) is ½ or less of the average particle size of a carbon material (a) and the average particle size of a metal (b) is ½ or less of the average particle size of the metal oxide (c). If the average particle size is controlled to fall within the aforementioned ranges, relaxation effect of volume expansion of a metal and an alloy phase can be more effectively obtained and a secondary battery having excellent balance between energy density, cycle life and efficiency can be obtained. More specifically, it is preferable that the average particle size of a silicon oxide (c) is set at ½ or less of the average particle size of graphite (a) and the average particle size of silicon (b) is set at ½ or less of the average particle size of silicon oxide (c). Much more specifically, the average particle size of silicon (b) can be set at, for example, 20 μm or less and preferably 15 μm or less.

As the negative electrode binder, for example, polyvinylidene fluoride, a vinylidene fluoride-hexafluoropropylene copolymer, a vinylidene fluoride-tetrafluoroethylene copolymer, a styrene-butadiene copolymer rubber, polytetrafluoroethylene, polypropylene, polyethylene, polyimide and polyamide-imide can be used. Of them, polyimide or polyamide-imide is preferable since binding property is high. The amount of the negative electrode binder used is preferably 5 to 25 parts by mass relative to 100 parts by mass of the negative electrode active material in consideration of the trade-off relationship between "sufficient binding property" and "high energy production".

The negative electrode collector is preferably aluminum, nickel, copper, silver and an alloy of them in view of electrochemical stability. The form thereof includes foil, planar-plate form and mesh form.

The negative electrode can be prepared by forming a negative electrode active material layer containing a negative electrode active material and a negative electrode binder, on a negative electrode collector. A method for forming a negative electrode active material layer, a doctor blade method, a die coater method, a CVD method and a sputtering method are mentioned. A negative electrode active material layer may be formed in advance, and then, a thin film of aluminum, nickel or an alloy of them is formed by a method such as vapor deposition or sputtering to form a negative electrode collector.

[2] Positive Electrode

A positive electrode has, for example, a positive electrode active material bound to a positive electrode collector with a positive electrode binder so that the positive electrode collector is covered therewith.

Examples of the positive electrode active material can include:

lithium manganites having a laminate structure or lithium manganites having a spinel structure such as $LiMnO_2$ and $Li_xMn_2O_4$ (0<x<2);

$LiCoO_2$, $LiNiO_2$ or those obtained by replacing a part of these transition metals with another metal;

lithium transition metal oxides such as $LiNi_{1/3}Co_{1/3}Mn_{1/3}O_2$ in which a specific transition metal does not exceed a half; and these lithium transition metal oxides containing Li in an excessively larger amount than the stoichiometric composition. Particularly, $Li_\alpha Ni_\beta Co_\gamma Al_\delta O_2$ ($1\leq\alpha\leq1.2$, $\beta+\gamma+\delta=1$, $\beta\geq0.7$, $\gamma\leq0.2$) or $Li_\alpha Ni_\beta Co_\gamma Mn_\delta O_2$ ($1\leq\alpha\leq1.2$, $\beta+\gamma+\delta=1$, $\beta\geq0.6$, $\gamma\leq0.2$) is preferable. The positive electrode active materials can be used alone or in combination of two types or more.

As the positive electrode binder, the same compounds as mentioned for the negative electrode binder can be used. Of them, in view of general versatility and low cost, polyvinylidene fluoride is preferable. The amount of positive electrode binder to be used is preferably 2 to 10 parts by mass relative to 100 parts by mass of the positive electrode active material in consideration of the trade-off relationship between "sufficient binding property" and "high energy production".

As a positive electrode collector, the same material as the negative electrode collector can be used.

To a positive electrode active material layer including a positive electrode active material, in order to reduce impedance, a conductive aid may be added. Examples of the conductive aid include carbonaceous fine particles such as graphite, carbon black and acetylene black.

[3] Electrolytic Solution

The electrolytic solution to be used in the exemplary embodiment contains an organic sulfurane compound. The organic sulfurane compound is an organic sulfur compound having sulfur atoms beyond an atomic value based on the octet rule, refers to an organic compound obtained by substituting at least part of hydrogen atoms of sulfurane ($\lambda^4$-sulfane, $SH_4$) having tetra valent sulfur atoms with an organic group, or substituting at least part of hydrogen atoms of pelsulfurane ($\lambda^6$-sulfane, $SH_6$) having hexa valent sulfur atoms with an organic group.

Since the electrolytic solution contains an organic sulfurane compound, the impedance of the obtained secondary battery decreases. Thus, the rate characteristics after high temperature storage improve and further the cycle characteristics under a high-temperature environment improve. More specifically, a highly-reactive organic sulfurane compound selectively reacts with a negative electrode surface to form a stable film, by which production of gas at a negative electrode is effectively suppressed and conceivably suppressing deterioration of battery characteristics under a high temperature environment. Particularly in the case where a ring- or chain-form carbonate is used as a nonaqueous electrolytic solution, the carbonate is sometimes decomposed to produce $CO_2$. In this case, if the electrolytic solution contains an organic sulfurane compound, the organic sulfurane compound is reductively decomposed selectively and effectively suppresses production of $CO_2$ caused by decomposition of the nonaqueous electrolytic solution. Note that, these effects are similarly exerted not only under a high-temperature environment but also under low-temperature environment.

Specific examples of the organic sulfurane compound include compounds represented by the following formulas (1) to (6):

[Formula 1]

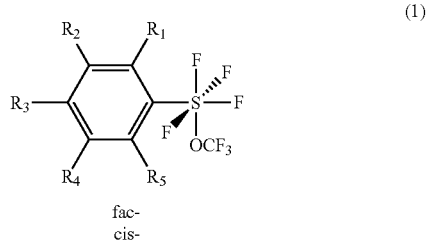

(1)

fac-
cis-

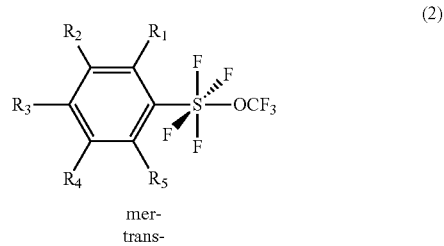

(2)

mer-
trans-

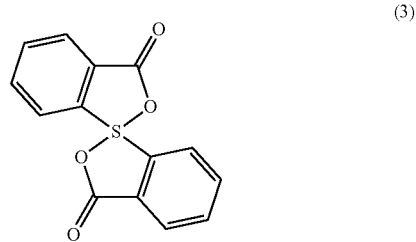

(3)

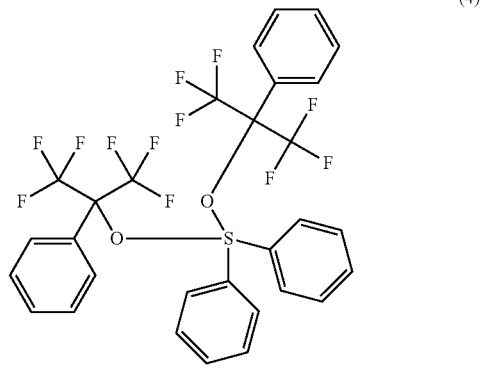

(4)

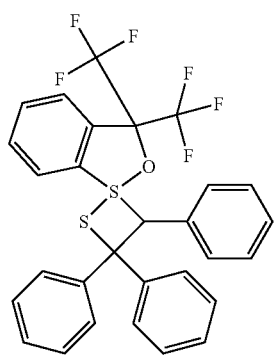

(5)

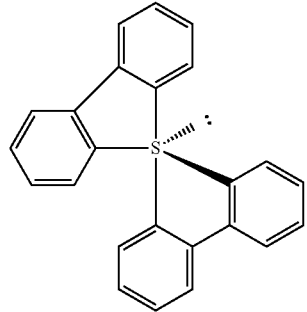

(6)

The organic sulfurane compounds can be used alone or in combination of two or more types.

Note that, in the formulas (1) and (2), $R_1$ to $R_5$ are each independently selected from a hydrogen atom, a halogen atom, a substituted or unsubstituted alkyl group, a substituted or unsubstituted alkoxy group, a substituted or unsubstituted cycloalkyl group, a substituted or unsubstituted aryl group, a substituted or unsubstituted heterocyclic group, a nitro group, a cyano group, —$SF_5$ and —$SF_4$—O—$CF_3$. Examples of the halogen atom include fluorine, chlorine, bromine and iodine. Examples of the substituent include a halogen atom, an alkyl group, an alkoxy group, a cycloalkyl group, an aryl group, a heterocyclic group, a nitro group, a cyano group, —$SF_5$, and —$SF_4$—O—$CF_3$. The number of carbon atoms of the substituted or unsubstituted alkyl group is preferably 1 to 30. The number of carbon atoms of the substituted or unsubstituted alkoxy group is preferably 1 to 30. The number of carbon atoms of the substituted or unsubstituted cycloalkyl group is preferably 4 to 30. The number of carbon atoms of the substituted or unsubstituted aryl group is preferably 6 to 30. The number of carbon atoms of the substituted or unsubstituted heterocyclic group is preferably 4 to 30. In the formulas (1) and (2), $R_1$ to $R_5$ are each preferably independently selected from a hydrogen atom, a substituted or unsubstituted alkyl group having 1 to 30 carbon atoms, and more preferably a hydrogen atom or a methyl group.

The organic sulfurane compound preferably has an S—O bond and is preferably a compound represented by any one of the above formulas (1) to (5). If the organic sulfurane compound has an S—O bond, the impedance of the secondary battery obtained is further reduced and the cycle characteristics are further improved. For example, if a negative electrode having Si is used, it is presumed that the organic sulfurane compound having an S—O bond may form a Si—O bond. In contrast, an organic sulfurane compound having no S—O bond (having only an S—C bond) presumably forms a Si—C bond. Of these bonds, a Si—O bond has higher ion conductivity and conceivably forms a stable film.

The electrolytic solution used in the exemplary embodiment usually contains a nonaqueous electrolytic solution stable in an operation voltage of a battery. Specific examples of the nonaqueous electrolytic solution include aprotonic organic solvents such as cyclic carbonates including propylene carbonate (PC), ethylene carbonate (EC), butylene carbonate (BC) and vinylene carbonate (VC); linear carbonates including dimethyl carbonate (DMC), diethyl carbonate (DEC), ethylmethyl carbonate (EMC) and dipropyl carbonate (DPC); propylene carbonate derivatives; and aliphatic carboxylic acid esters including methyl formate, methyl acetate and ethyl propionate. Preferable examples of the nonaqueous electrolytic solution include cyclic or linear carbonates such as ethylene carbonate (EC), propylene carbonate (PC), butylene carbonate (BC), vinylene carbonate (VC), dimethyl carbonate (DMC), diethyl carbonate (DEC), ethylmethyl carbonate (MEC) and dipropyl carbonate (DPC). The nonaqueous electrolytic solutions may be used alone or in combination of two or more types.

The content of the organic sulfurane compound relative to the total of the organic sulfurane compound and the nonaqueous electrolytic solution, in view of effectively forming a coating film on a negative electrode surface, is preferably 0.005 to 10% by mass and more preferably 0.1 to 7% by mass.

The electrolytic solution used in the exemplary embodiment is prepared by adding a supporting electrolyte to a solution mixture of an organic sulfurane compound and a nonaqueous electrolytic solution. Specific examples of the supporting electrolyte include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$ and $LiN(CF_3SO_2)_2$. The supporting electrolytes can be used singly or in combination of two types or more.

[4] Separator

As the separator, a porous film such as polypropylene or polyethylene and unwoven cloth can be used. Furthermore, they may be laminated and used as the separator.

[5] Outer Package

As the outer package, as long as it is stable in an electrolytic solution and has a sufficient vapor barrier, any material can be appropriately selected. For example, in the case of a laminate type secondary battery, a laminate film such as polypropylene or polyethylene coated with aluminum or silica can be used as the outer package. Particularly, in view of suppression of volume expansion, an aluminum laminate film is preferably used.

In the case of a secondary battery using a laminate film as an outer package, if gas is generated, deformation of an electrode element becomes significantly large compared to a secondary battery using a metal can as an outer package. This is because the laminate film is easily deformed compared to a metal can by the inner pressure of a secondary battery. Furthermore, in sealing a secondary battery using a laminate film as an outer package, usually, the inner pressure of the battery is lower than the atmospheric pressure. Since no extra space is present in the interior portion, gas, if it is generated, may directly change volume of the battery and deform the electrode element.

However, the secondary battery according to the exemplary embodiment can overcome the aforementioned problems. By virtue of this, a laminate type lithium ion secondary battery having an excellent degree of freedom in cell capacity design can be provided at low cost by changing the number of laminate layers.

EXAMPLES

Hereinafter, the exemplary embodiment will be more specifically described by way of Examples.

Example 1

Figure 2:
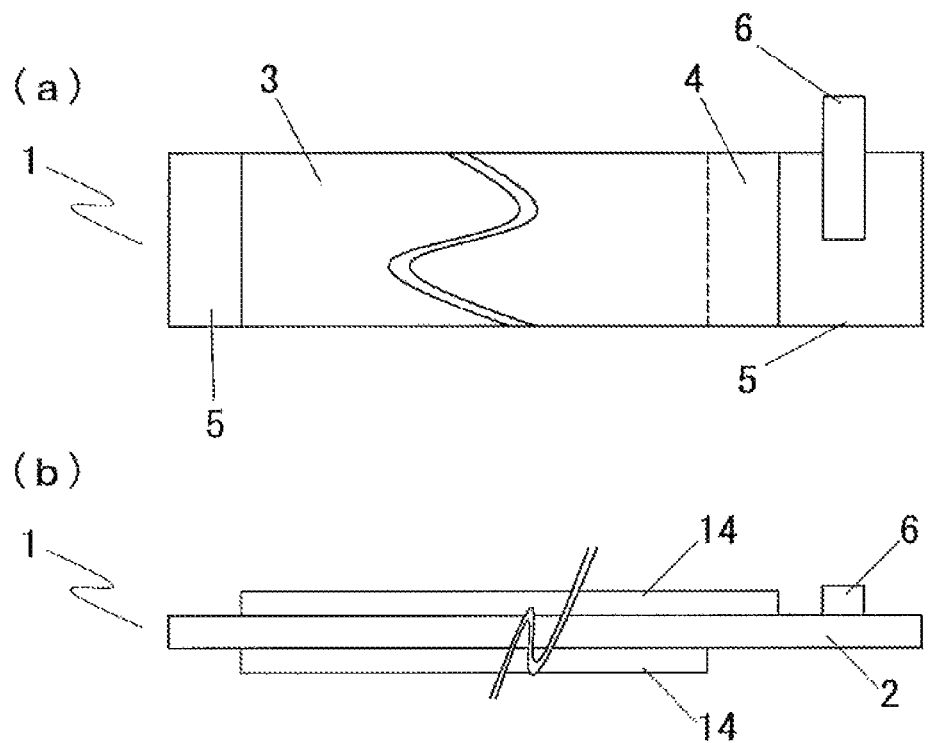
FIG. 2 This is an explanatory view showing the structure of a positive electrode of the lithium ion secondary battery of Example 1.

Referring to FIG. 2, preparation of a positive electrode will be described. FIG. 2 (a) shows a side view of a positive electrode and FIG. 2 (b) shows a top view of the positive electrode. 85% by mass of $LiMn_2O_4$ and 7% by mass of acetylene black serving as a conductive aid and 8% by mass of polyvinylidene fluoride serving as a binder were mixed. To this, N-methylpyrrolidone was added and further mixed to prepare positive electrode slurry. The slurry was applied to both surfaces of Al foil 2 having a thickness of 20 μm and serving as a collector, by a doctor blade method so as to obtain a thickness of 160 μm after a roll press treatment. This was dried at 120° C. for 5 minutes and subjected to a press step to form a positive electrode active material both-surface coated portion 3. Note that, at one of the ends of a positive electrode 1, a positive electrode active material non-coated portion 5 in which a positive electrode active material is not applied to either one of the surfaces and a positive electrode active material one-surface coated portion 4 in which a positive electrode active material is only applied to one of the surfaces were provided. To the positive electrode active material non-coated portion 5, a positive electrode conductive tab 6 was provided. Furthermore, on the other end of the positive electrode 1, a positive electrode active material non-coated portion 5 was provided.

Figure 3:
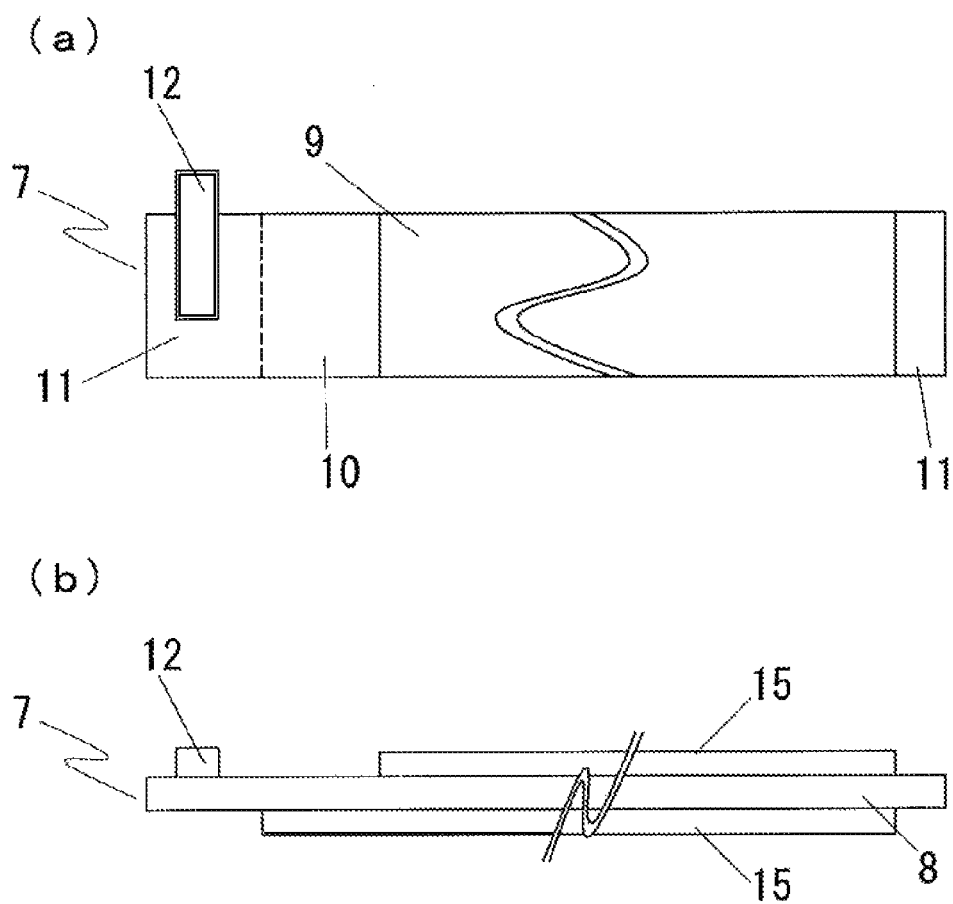
FIG. 3 This is an explanatory view showing the structure of a negative electrode of the lithium ion secondary battery of Example 1.

Referring to FIG. 3, preparation of the negative electrode will be described. FIG. 3 (a) shows a side view of a negative electrode and FIG. 3 (b) shows a top view of the negative electrode. 90% by mass of Graphite, 1% by mass of acetylene black serving as a conductive aid, and 9% by mass of polyvinylidene fluoride serving as a binder were mixed. To this, N-methylpyrrolidone was added and further mixed to obtain negative electrode slurry. The slurry was applied to both surfaces of Cu foil 8 having a thickness of 10 μm and serving as a collector so as to obtain a thickness of 120 μm after a roll press treatment. This was dried at 120° C. for 5 minutes and subjected to a press step to form a negative electrode active material both-surface coated portion 9. Note that, at one of the ends of a negative electrode 7, a negative electrode active material one-surface coated portion 10 in which a negative electrode active material is only applied to one of the surfaces and a negative electrode active material non-coated portion 11 in which a negative electrode active material is not applied were provided. To the negative electrode active material non-coated portion 11, a negative electrode conductive tab 12 was provided. Furthermore, on the other end of the negative electrode 7, a negative electrode active material non-coated portion 11 was provided.

Figure 4:
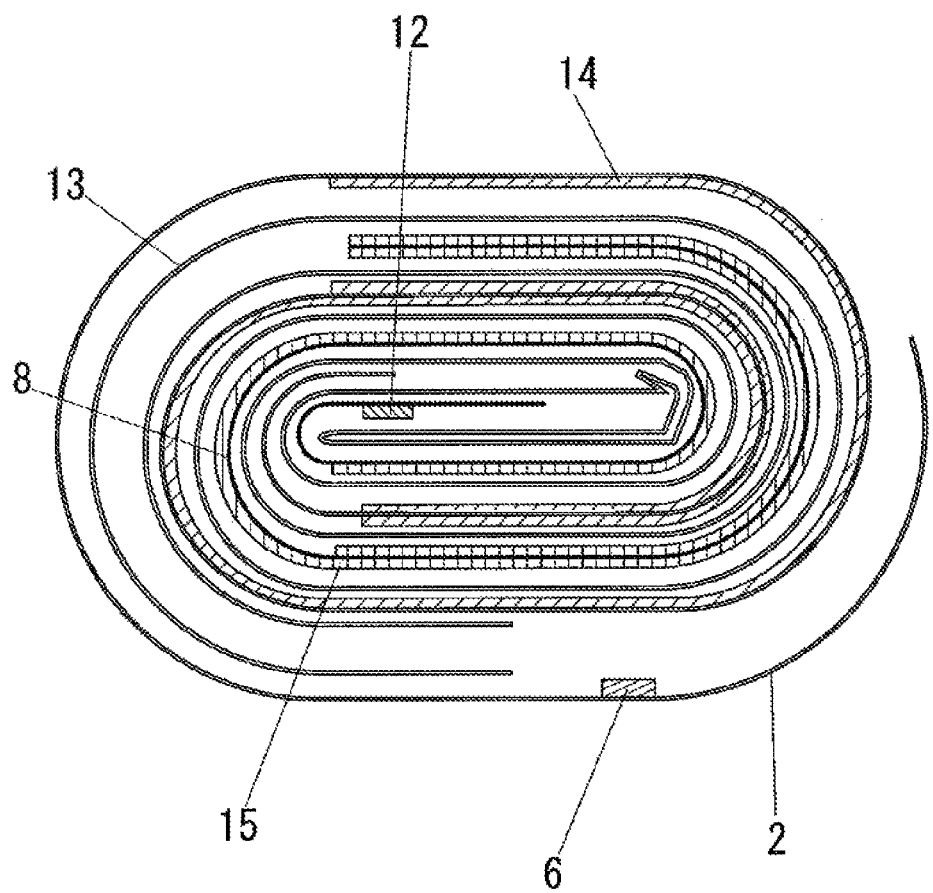
FIG. 4 This is an explanatory view showing the structure of battery elements of the lithium ion secondary battery of Example 1 after winding.

Referring to FIG. 4, preparation of the battery element will be described. Two separators 13, each being formed of fine porous polypropylene film having a film thickness of 25 μm and a porosity of 55% and to which a hydrophilic treatment was applied, were adhered by welding and cut. The cut portion was immobilized to a winding core of a winding apparatus. After winding, the leading edges of the positive electrode 1 (FIG. 2) and the negative electrode 7 (FIG. 3) were introduced. In the positive electrode 1, a portion opposite to the portion to which the positive electrode conductive tab 6 is connected was the leading edge, whereas, in the negative electrode 7, the portion to which the negative electrode conductive tab 12 is connected was the leading edge. The negative electrode 7 is arranged between two separators 13 and the positive electrode 1 was arranged on each of the upper surfaces of the separators 13. Winding was made by rotating the winding core to form a battery element (hereinafter, referred to as "jelly roll" (J/R)).

The J/R was packaged in an embossed laminate outer package. From the laminate outer package, the positive electrode conductive tab 6 and the negative electrode conductive tab 12 were pulled out and a side of the laminate outer package was folded back and thermally fused except a liquid injection portion.

In the meantime, 99 parts by mass of a carbonate-based nonaqueous electrolytic solution having EC/DEC=30/70 (volume ratio) and 1 part by mass of an organic sulfurane compound ($R_1$ to $R_5$:H) (the content of the organic sulfurane compound:1% by mass) represented by Formula (1) were mixed. To this, $LiPF_6$ serving as a supporting electrolyte was further dissolved in a concentration of 1 mol/l to obtain an electrolytic solution.

Then, the electrolytic solution was injected from the liquid injection portion and vacuum impregnation was performed. The liquid injection portion was thermally fused to prepare a secondary battery.

Example 2

The same manner as in Example 1 was conducted except that the organic sulfurane compound ($R_1$ to $R_5$:$CH_3$) represented by formula (1) was used.

Example 3

The same manner as in Example 1 was conducted except that the organic sulfurane compound represented by formula (3) was used.

Example 4

The same manner as in Example 1 was conducted except that the organic sulfurane compound represented by formula (4) was used.

Example 5

The same manner as in Example 1 was conducted except that the organic sulfurane compound represented by formula (5) was used.

Example 6

The same manner as in Example 4 was conducted except that the content of the organic sulfurane compound was set at 0.004% by mass.

Example 7

The same manner as in Example 4 was conducted except that the content of the organic sulfurane compound was set at 0.005% by mass.

Example 8

The same manner as in Example 4 was conducted except that the content of the organic sulfurane compound was set at 2% by mass.

Example 9

The same manner as in Example 4 was conducted except that the content of the organic sulfurane compound was set at 5% by mass.

Example 10

The same manner as in Example 4 was conducted except that the content of the organic sulfurane compound was set at 10% by mass.

Example 11

The same manner as in Example 4 was conducted except that the content of the organic sulfurane compound was set at 11% by mass.

Comparative Example 1

The same manner as in Example 4 was conducted except that the organic sulfurane compound was not used.
<Evaluation>

The rate characteristics of the secondary batteries prepared in Examples 1 to 11 and Comparative Example 1 were measured. More specifically, first, a secondary battery was charged up to 4.2 V and the discharge capacity at 2C and 0.2C ($C_{2C}$ and $C_{0.2C}$) was measured in a constant-temperature vessel kept at 20° C., and the ratio of $C_{2C}/C_{0.2C}$ was specified as rate characteristics (initial). In contrast, the secondary battery was charged up to 4.1 V and stored in this state in a constant-temperature vessel kept at 60° C. for 12 weeks and then the discharge capacity at 2C and 0.2C ($C_{2C}$ and $C_{0.2C}$) was measured in a constant-temperature vessel kept at 20° C. The ratio of $C_{2C}/C_{0.2C}$ was specified as rate characteristics (after storage). The results are shown in Table 1.

TABLE 1

| | Organic sulfurane compound | | Rate characteristics $C_{2C}/C_{0.2C}$ | |
|---|---|---|---|---|
| | Type | Content (% by mass) | Initial | After storage |
| Example 1 | (1) [$R_1$~$R_5$: H] | 1 | 0.83 | 0.65 |
| Example 2 | (1) [$R_1$~$R_5$: $CH_3$] | 1 | 0.79 | 0.62 |
| Example 3 | (3) | 1 | 0.84 | 0.70 |
| Example 4 | (4) | 1 | 0.81 | 0.82 |
| Example 5 | (5) | 1 | 0.80 | 0.68 |
| Example 6 | (4) | 0.004 | 0.85 | 0.50 |
| Example 7 | (4) | 0.005 | 0.84 | 0.66 |
| Example 8 | (4) | 2 | 0.80 | 0.70 |
| Example 9 | (4) | 5 | 0.79 | 0.65 |
| Example 10 | (4) | 10 | 0.77 | 0.60 |
| Example 11 | (4) | 11 | 0.75 | 0.47 |
| Comparative Example 1 | Not used | — | 0.85 | 0.30 |

As shown in Table 1, the rate characteristics of the secondary batteries prepared in Examples 1 to 11 and stored at 60° C. were satisfactory than the rate characteristics of the secondary battery prepared in Comparative Example 1. From the results, it was demonstrated that deterioration in rate characteristics during a high temperature storage can be suppressed in the exemplary embodiments.

Example 12

Graphite having an average particle size of 30 μm and serving as a carbon material (a), silicon having an average particle size of 5 μm and serving as a metal (b) and amorphous silicon oxide ($SiO_x$, $0<x\leq 2$) having an average particle size of 13 μm and serving as a metal oxide (c) were weighed in a mass ratio of 5:35:60. These were mixed by a so-called mechanical milling for 24 hours to obtain a negative electrode active material. Note that, in the negative electrode active material, silicon serving as the metal (b) was dispersed in silicon oxide ($SiO_x$, $0<x\leq 2$) serving as the metal oxide (c).

The negative electrode active material (an average particle size D50=5 μm) and a polyimide (trade name: U Varnish A, manufactured by Ube Industries, Ltd.) serving as a negative electrode binder were weighed in a mass ratio of 90:10. They were mixed with n-methylpyrrolidone to prepare negative electrode slurry. The negative electrode slurry was applied to copper foil of 10 μm in thickness and dried, and further a heat treatment was applied under a nitrogen atmosphere of 300° C. to prepare a negative electrode.

A lithium-nickel oxide ($LiNi_{0.80}Co_{0.15}Al_{0.15}O_2$) serving as a positive electrode active material, carbon black serving as a conductive aid and polyvinylidene fluoride serving as a positive electrode binder were weighed in a mass ratio of 90:5:5. These were mixed with n-methylpyrrolidone to prepare positive electrode slurry. The positive electrode slurry was applied to aluminum foil of 20 μm in thickness, dried, and further pressed to prepare a positive electrode.

Three layers of positive electrodes and four layers of negative electrodes obtained were alternately laminated with a porous polypropylene film serving as a separator interposed between them. The end portions of the positive electrode collectors not covered with the positive electrode active material and the end portions of the negative electrode collectors not covered with the negative electrode active material were separately adhered by welding. Furthermore, to the welded sites, the positive electrode terminal made of aluminum and the negative electrode terminal made of nickel were separately welded to provide an electrode element having a planer laminate layer structure.

In contrast, 98 parts by mass of a carbonate based nonaqueous electrolytic solution composed of EC/PC/DMC/EMC/DEC=20/20/20/20/20 (volume ratio) and 2 parts by mass of an organic sulfurane compound (the content of organic sulfurane compound:2% by mass) represented by formula (3) were mixed. In this, $LiPF_6$ serving as a supporting electrolyte was further dissolved in a concentration of 1 mol/l to obtain an electrolytic solution.

The above electrode element was packaged with an aluminum laminate film serving as an outer package and the electrolytic solution was injected within the outer package. Thereafter, the inner pressure of the aluminum laminate film was reduced to 0.1 atm and sealed to prepare a secondary battery.

Example 13

The same manner as in Example 12 was conducted except that the organic sulfurane compound represented by formula (4) was used.

Example 14

The same manner as in Example 12 was conducted except that the organic sulfurane compound represented by formula (6) was used.

Example 15

The same manner as in Example 13 was conducted except that the content of an organic sulfurane compound was set at 0.004% by mass.

Example 16

The same manner as in Example 13 was conducted except that the content of an organic sulfurane compound was set at 0.005% by mass.

Example 17

The same manner as in Example 13 was conducted except that the content of an organic sulfurane compound was set at 1% by mass.

Example 18

The same manner as in Example 13 was conducted except that the content of an organic sulfurane compound was set at 5% by mass.

Example 19

The same manner as in Example 13 was conducted except that the content of an organic sulfurane compound was set at 10% by mass.

Example 20

The same manner as in Example 13 was conducted except that the content of an organic sulfurane compound was set at 11% by mass.

Example 21

A negative electrode active material containing carbon, silicon and amorphous silicon oxide ($SiO_x$, $0<x\leq 2$) in a mass ratio of 5:35:60 was obtained in accordance with the method described in Patent Literature 3. Note that, in the negative electrode active material, silicon serving as the metal (b) was dispersed in amorphous silicon oxide serving as the metal oxide (c). The same manner as in Example 13 was conducted except that the negative electrode active material was used.

Comparative Example 2

The same manner as in Example 12 was conducted except that an organic sulfurane compound was not used.

Comparative Example 3

The same manner as in Example 12 was conducted except that 1,3-propanesultone was used in place of an organic sulfurane compound.

<Evaluation>

The cycle characteristics of the secondary batteries prepared in Examples 12 to 21 and Comparative Examples 2 and 3 were measured. Specifically, a charge-discharge test of a secondary battery was repeated 500 times in a constant temperature vessel kept at 20° C. or 60° C. within a voltage range of 2.5 V to 4.1 V. Then, the rate of (discharge capacity at the 500th cycle)/(discharge capacity at the 1st cycle) (unit: %) was calculated as a cycle retention rate. Furthermore, the rate of (volume of battery at the 500th cycle)/(volume of battery before the cycle) (unit: %) was calculated as an expansion rate. The results are shown in Table 2. Note that, in the charge-discharge tests for Examples 15 and Comparative Examples 2 and 3, capacity significantly decreased at 20° C. and thus cycle characteristics were not measured.

TABLE 2

| | Organic sulfurane compound | | Cycle retention rate (%) | | Expansion rate (%) | |
| --- | --- | --- | --- | --- | --- | --- |
| | Type | Content (% by mass) | 20° C. | 60° C. | 20° C. | 60° C. |
| Example 12 | (3) | 2 | 0.30 | 0.60 | 1.05 | 1.07 |
| Example 13 | (4) | 2 | 0.35 | 0.62 | 1.03 | 1.07 |
| Example 14 | (6) | 2 | 0.15 | 0.57 | 1.43 | 1.61 |
| Example 15 | (4) | 0.004 | Not measured | 0.58 | Not measured | 1.49 |
| Example 16 | (4) | 0.005 | 0.30 | 0.60 | 1.03 | 1.07 |
| Example 17 | (4) | 1 | 0.34 | 0.63 | 1.02 | 1.10 |
| Example 18 | (4) | 5 | 0.32 | 0.62 | 1.03 | 1.09 |
| Example 19 | (4) | 10 | 0.30 | 0.61 | 1.10 | 1.18 |
| Example 20 | (4) | 11 | 0.20 | 0.59 | 1.23 | 1.50 |
| Example 21 | (4) | 2 | 0.36 | 0.64 | 1.02 | 1.05 |
| Comparative Example 2 | Not used | — | Not measured | 0.55 | Not measured | 1.70 |
| Comparative Example 3 | (1,3-propane sultone) | 2 | Not measured | 0.57 | Not measured | 1.71 |

As shown in Table 2, the cycle retention rate and the expansion rate at 60° C. of the secondary batteries prepared in Examples 12 to 21 were more satisfactory than those of the secondary batteries of Comparative Examples 2 and 3. From the results, it was demonstrated that deterioration in cycle characteristics under a high temperature environment can be suppressed in the exemplary embodiments.

This application claims a priority based on Japanese Patent Application No. 2010-196623 filed Sep. 2, 2010, the entire disclosure of which is incorporated herein.

In the above, the invention of the present application has been explained by way of exemplary embodiments and Examples; however, the invention of the present application is not limited to the above exemplary embodiments and Examples. The constitution and details of the invention of the present application can be modified in various ways within the scope of the invention of the present application as long as those skilled in the art can understand them.

INDUSTRIAL APPLICABILITY

The exemplary embodiment can be used in various industrial fields requiring power supply and the industrial fields of transporting, storing and supplying electric energy. Specifically, the exemplary embodiment can be used as a power supply for mobile equipment such as mobile telephones and note PCs; a power supply for transfer and transportation medium such as electric trains, satellites and submarines including electric vehicles such as electric cars, hybrid cars, electric motorcycles and electric assist bicycles; backup power supply such as UPS; and storage equipment for storing electric power obtained by photovoltaic power generation and wind-generated electricity.

REFERENCE SIGNS LIST a Negative electrode
b Separator
c Positive electrode
d Negative electrode collector
e Positive electrode collector
f Positive electrode terminal
g Negative electrode terminal
1 Positive electrode
2 Al foil
3 Positive electrode active material both-surface coated portion
4 Positive electrode active material one-surface coated portion
5 Positive electrode active material non-coated portion
6 Positive electrode conductive tab
7 Negative electrode
8 Cu foil
9 Negative electrode active material both-surface coated portion
10 Negative electrode active material one-surface coated portion
11 Negative electrode active material non-coated portion
12 Negative electrode conductive tab
13 Separator
14 Positive electrode active material layer
15 Negative electrode active material layer

The invention claimed is:
1. A secondary battery comprising an electrode element in which a positive electrode and a negative electrode are arranged so as to face each other, an electrolytic solution and an outer package packaging the electrode element and the electrolytic solution, wherein
the negative electrode is formed by binding a negative electrode active material to a negative electrode collector, with a negative electrode binder; and the electrolytic solution comprises an organic sulfurane compound, and wherein the organic sulfurane compound is a compound represented by any one of the following formulas (1) to (5):

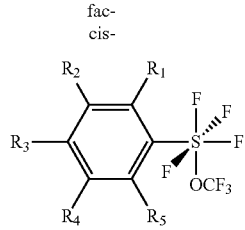

(1) fac-cis-

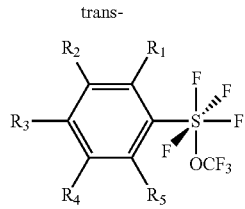

(2) mer-trans-

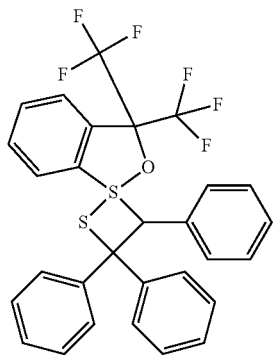

(3)

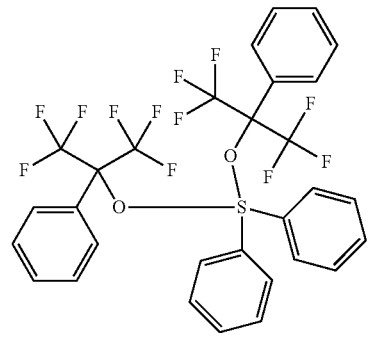

(4)

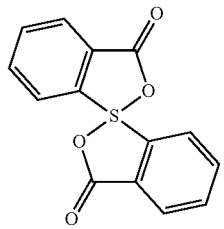

(5)

wherein in formulas (1) and (2), $R_1$ to $R_5$ are each independently selected from a hydrogen atom, a halogen atom, a substituted or unsubstituted alkyl group, a substituted or unsubstituted alkoxy group, a substituted or unsubstituted cycloalkyl group, a substituted or unsubstituted aryl group, a substituted or unsubstituted heterocyclic group, a nitro group, a cyano group, —SF$_5$ and —SF$_4$—O—CF$_3$.

2. The secondary battery according to claim 1, wherein the electrolytic solution comprises the organic sulfurane compound and a nonaqueous electrolytic solution; the content of the organic sulfurane compound in the electrolytic solution is 0.005 to 10% by mass relative to the total of the organic sulfurane compound and the nonaqueous electrolytic solution.

3. The secondary battery according to claim 1, wherein the negative electrode active material comprises a carbon material (a) capable of absorbing and releasing lithium ions.

4. The secondary battery according to claim 1, wherein the negative electrode active material comprises a metal (b) capable of forming an alloy with lithium and a metal oxide (c) capable of absorbing and releasing lithium ions.

5. The secondary battery according to claim 4, wherein the metal oxide (c) wholly or partly has an amorphous structure.

6. The secondary battery according to claim 4, wherein the metal oxide (c) is an oxide of a metal constituting the metal (b).

7. The secondary battery according to claim 4, wherein the metal (b) is wholly or partly dispersed in the metal oxide (c).

8. The secondary battery according to claim 4, wherein the metal (b) is silicon.

9. The secondary battery according to claim 1, wherein the negative electrode binder is a polyimide or polyamide-imide.

10. The secondary battery according to claim 1, wherein the electrode element has a planar laminate structure.

11. The secondary battery according to claim 1, wherein the outer package is an aluminum laminate film.

12. A secondary battery electrolytic solution comprising an organic sulfurane compound, wherein the organic sulfurane compound is a compound represented by any one of the following formulas (1) to (5):

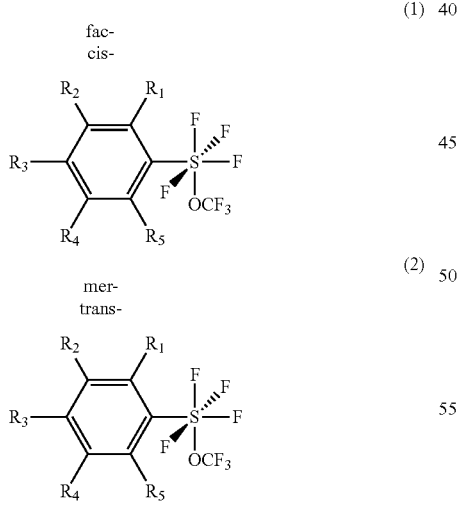

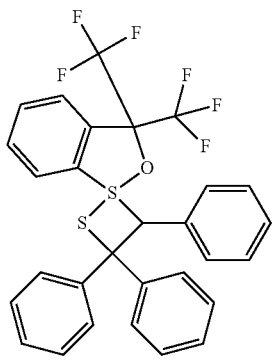

(3)

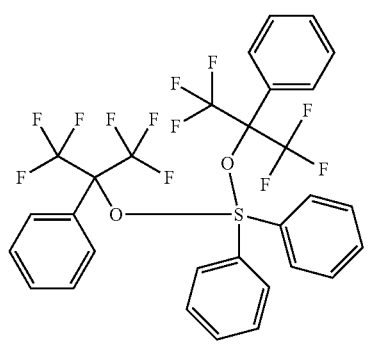

(4)

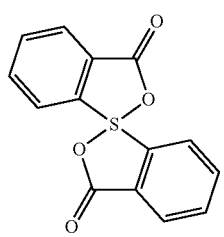

(5)

wherein in formulas (1) and (2), R$_1$ to R$_5$ are each independently selected from a hydrogen atom, a halogen atom, a substituted or unsubstituted alkyl group, a substituted or unsubstituted alkoxy group, a substituted or unsubstituted cycloalkyl group, a substituted or unsubstituted aryl group, a substituted or unsubstituted heterocyclic group, a nitro group, a cyano group, —SF$_5$ and —SF$_4$—O—CF$_3$.

13. The secondary battery electrolytic solution according to claim 12, comprising the organic sulfurane compound and a nonaqueous electrolytic solution, wherein the content of the organic sulfurane compound is 0.005 to 10% by mass relative to the total of the organic sulfurane compound and the nonaqueous electrolytic solution.

\* \* \* \* \*